United States Patent [19]

Carle

[11] 3,881,708
[45] May 6, 1975

[54] MIXING EXTRUDERS
[75] Inventor: George E. Carle, Derby, Conn.
[73] Assignee: USM Corporation, Boston, Mass.
[22] Filed: June 15, 1972
[21] Appl. No.: 263,118

[52] U.S. Cl............................ 259/191; 259/DIG. 13
[51] Int. Cl............................................. B29b 1/10
[58] Field of Search............ 259/191, 193, DIG. 13, 259/9, 10; 425/204, 208

[56] References Cited
UNITED STATES PATENTS
| 3,160,916 | 12/1964 | Blakey, Jr. | 259/193 |
| 3,593,379 | 7/1971 | Hendry | 425/208 X |
| 3,650,652 | 3/1972 | Dray et al. | 425/208 X |
| 3,721,427 | 3/1973 | Upmeier | 259/191 |

FOREIGN PATENTS OR APPLICATIONS
| 1,271,973 | 7/1968 | Germany | 425/208 |
| 1,913,615 | 10/1969 | Germany | 425/208 |

Primary Examiner—Harvey C. Hornsby
Assistant Examiner—Alan Cantor
Attorney, Agent, or Firm—Ralph D. Gelling; Vincent A. White; Richard B. Megley

[57] ABSTRACT

An extruder, adapted in a preferred form to provide additional mixing to a mass of material such as rubber or plastics preliminarily mixed in means such as an intensive high shear mixer. The extruder includes a body having a bore therethrough, with a feed opening at one end and a discharge opening at the other end, a screw disposed therein substantially coextensive therewith and having a primary flight extending substantially the full length thereof and means for rotating said screw in said cylinder, said screw and body being divided into a feed section, compression section, mixing section and (in a preferred embodiment) a discharge section. Said compression section is disposed between said feed section and said mixer section. Said mixer section screw includes a secondary independent blending flight, and said screw is adapted with a high shear section intermediate said mixing section and said discharge opening.

1 Claim, 3 Drawing Figures

MIXING EXTRUDERS

BACKGROUND OF THE INVENTION

This invention relates to an extruder for mixing and working compounds such as rubber, plastics and the like. More particularly, the extruder of the present invention relates to improvements in apparatus usable in a process line including mixing apparatus such as a batch-type, intensive, high-shear mixer such as is available under the registered trademark BANBURY from the Farrel Company Division of USM Corporation. In such a process line, the output of the intensive mixer is generally fed to further processing equipment, such as a roller die, or a pelletizer, so that the compounded rubber or plastics or the like may be further processed. Illustrations of such equipment appear in U.S. Pat. Nos. 3,359,597 and 3,618,162. Conventional apparatus for supplying the output of a batch type intensive mixer to the further processing equipment includes various extruder apparatus which essentially functions as a transfer mechanism to carry the output from the mixer to the later processor such as to the bite or nip of the calender rolls of a roller die. U.S. Pat. No. Re.26,147 is illustrative of apparatus which has been utilized for such purpose.

Since the batch-type intensive mixers are by their very nature intermittent in their output of materials to be further processed, interruptions frequently occur in the feed to subsequent processing equipment. The rubber and plastics industry has long desired the establishment of a continuous process line for the production of their rubber and plastics compounds.

To this end the continuous mixer described in U.S. Pat. No. 3,154,808 has provided a continuous intensive, high-shear mixing machine to provide continuity in rubber and plastics processing lines.

While continuous intensive mixers meet certain of the needs of the processing industry, the desirability of continuity in the process line cannot always override the economic impact of replacing the otherwise widely successful and reliable batch type intensive mixers which are commonly found in processing plants.

Intensive mixers are large, heavy, expensive pieces of machinery which generally have a long service life. The batch-type intensive mixers distributed under the BANBURY trademark have enjoyed wide success in the industry for over 60 years and thousands are presently operated on a daily basis throughout the world. Owners and operators of these presently serviceable machines cannot discontinue their dependence upon the batch-type mixers in favor of continuous mixers merely for the advantage of continuous processing.

Further, continued efforts have been directed both in mixer design and operation to maximize the output rates of mixing machines (both batch and continuous) in order to insure an efficiently operating rubber or plastics processing line. This may be accomplished by discharging the quantity of mixed material at a lower quality of mix than ultimately desired, into a mixing extruder. The mixing extruder may then raise the level of mix quality to the desired value as it is transferred to the next processing stage. A variety of transfer extruders are presently on the market which attempt to work the output of such intensive mixers. Generally, these existing extruders are directed to refining of a particular material, and are not readily adaptable to an on-line change of mixed material. The varying requirements of present day industry require a versatility in machinery so that these needs may be met. It is with the above needs in mind that the mixing extruder of the present invention was conceived and developed.

SUMMARY OF THE INVENTION

The overall objects of the invention include providing a mixing extruder for processing materials such as rubber, plastics and the like which, in addition to the normal function of extrusion of the processed material, provides additional mixing and mixing/compounding and a continuity of processing if fed by an intermittent mixer source.

To these ends and in accordance with certain features of the invention, the mixing extruder includes a body having a longitudinal bore and having a feed opening for the introduction of material to be extruded. The feed opening is disposed generally at one end of said body and a discharge opening is disposed at the opposite end of said body. A rotor substantially coextensive with said body and having a primary screw flight also substantially coextensive with said rotor is disposed in said bore. The apparatus also includes means for rotating said rotor in said body. Said rotor and body include a feed section adjacent said feed opening, a material compressing section and a mixing section disposed intermediate said feed section and said discharge opening. The rotor in said mixing section has a secondary blending screw flight disposed intermediate said primary flight, and a shear collar disposed on said screw intermediate said mixing section and said discharge opening.

DESCRIPTION OF THE PREFERRED EMBODIMENT

Figure 1:
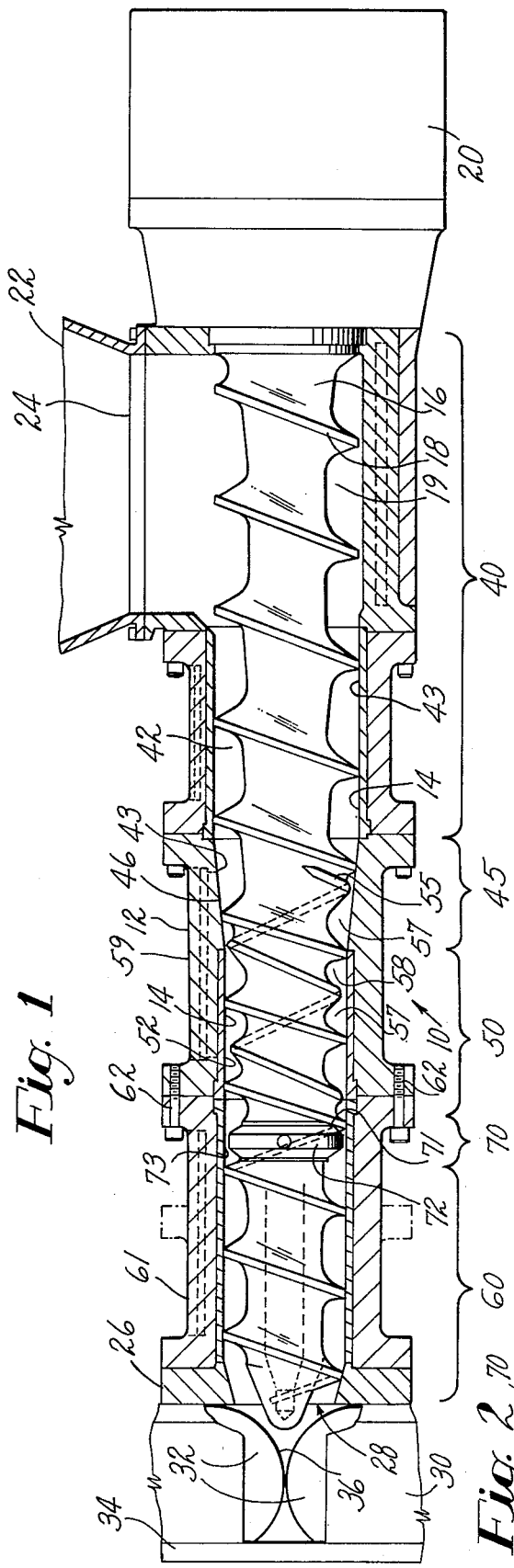
FIG. 1 is an elevational view, partially in section of apparatus embodying the invention.

Referring now to the drawings and in particular to FIG. 1, reference numeral 10 indicates a mixing extruder illustrative of the invention. The extruder 10 includes a body portion 12 having a bore 14 longitudinally extending therein. Within bore 14 a rotor 16 having a primary helical screw flight 18 is disposed for rotary movement. Flight 18 forms a primary channel 19 on rotor 16 for advancing material to be mixed through body 12. Rotor 16 is adapted to be driven through a suitable motor and gearing means 20, shown generally in a housing at one end of extruder 10. Such means 20 are well known in the art. A hopper 22 is disposed on body 12 communicating with bore 14 through a feed opening 24. Material deposited in hopper 22 is advanced by rotor 16 and screw flight 18 longitudinally through said bore 14 in channel 19 to an extruder head 26 which generally defines discharge opening 28, which, in turn, discharges the material to receiving apparatus 30 of a process line.

In the illustrated embodiment of FIG. 1 the receiving apparatus 30 is a roller die having cooperating rolls 32 which are rotatably supported in a frame 34. The material exiting the discharge opening 28 is deposited at the nip 36 of said rolls 32 for further processing such as being formed into generally sheet form.

Mixing extruder 10 may be described in more detail by reference to individual sections of the body 12 and rotor 16 which include feed section 40, compression section 45, mixing section 50 and, in the embodiment illustrated, discharge section 60.

Feed section 40 includes that portion of the body and rotor which extends generally from the rearmost portion of the hopper 22 and hopper opening 24 to a point in said bore 14 substantially forward of the feed hopper 22. The primary flight 18 of rotor 16 spirals coextensively with the rotor through feed section 40 of body 12. The rotor and flight's general function is to slice off portions of the plastic mass of material (such as bulk rubber) placed in feed hopper 22 and projecting through the opening 24 in that region. The material is trapped in channel 19 and conveyed forwardly to the closed portion 42 of feed section 40.

In the illustrated embodiment of a mixing extruder for handling a hot, partially mixed, batch of material from an intensive batch type mixer for feed to calender, the hopper opening 24 extends longitudinally about 4 feet long feed section 40. The diameter of the bore 14 of body 12 measures about 2 feet, and the feed section 40 of the illustrated mixing extruder 10 extends approximately 6 feet in length from the rearmost portion of hopper 22 to the foremost extent of the feed section. It is to be understood that these dimensions are illustrative only and may be widely varied to adapt the invention of the mixing extruder to various materials and equipment.

Figure 3:
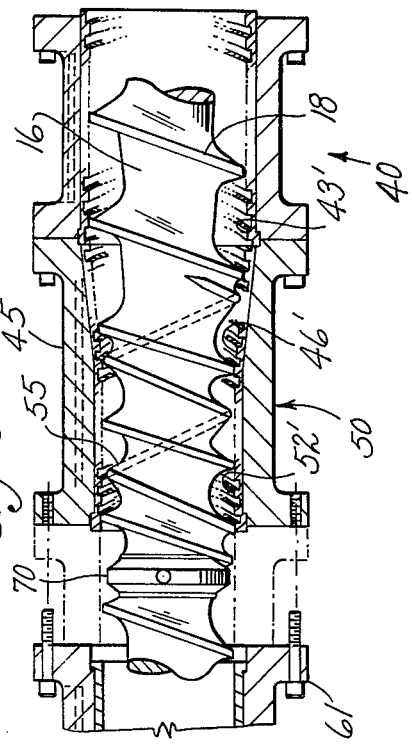
FIG. 3 is a partial section view of an alternative embodiment of the apparatus of FIG. 1.

In the illustrated embodiment the internal wall 43 of bore 14 in feed section 40 is shown as being smooth. As shown in FIG. 3, the wall 43' of the feed section 40 may be adapted with grooves which, according to requirements of various materials, may be either longitudinal or helical. Under certain operating conditions such grooved configurations assist the forward thrust or flow of material axially along the rotor 16 in channel 19 through the body 12.

It is a function of the closed portion 42 of feed section 40 to develop the requisite pressure on the material to be mixed so that it may be advanced through the succeeding sections, as into the mixing section 50. Thus, the primary flight 18 on rotor 16 throughout this feed section 40 is illustrated as being capable of pumping material sliced off the bulk material in the hopper. As such, flight 18 closely fits wall 43 and upon rotation of rotor 16 forces the material in channel 19 axially along the feed section 40 into the mixing section 50.

Efficient, thorough mixing depends upon the channel 19 within mixing section 50 being full of material so that the material in that section is necessarily subjected to the action of the mixing flights of the rotor. However, bulk feeding of materials to the flight 18 in the feed section 40 is often quite inefficient, with the result being that the channel 19 in closed portion 42 will not be completely filled. The feed of bulk rubber, or a heavy bulk mass of plastic material is characteristically inefficient in that flight 18 actually slices off portions of the bulk mass and forces the material into closed portion 42. To this end, compression section 45 is disposed between feed section 40 and mixing section 50. Thus, it serves to receive material from feed section 40 and compact it to fill the rotor flight 18 within mixing section 50.

Compression of material is achieved by a reduction in the volume of channel 19 ahead of flight 18 which is advancing the material. In the illustrated embodiment, bore 14 in feed section 40 has a larger diameter than mixing section 50. Disposed intermiediate these is compression section 45. In compression section 45, walls 43 converge to form a tapered portion 46. Since the diameter of bore 14 and the radial projections of flight 18 reduce, the volume of channel 19 reduces in the direction of the advancing material. Since the volume available in channel 19 for material decreases, the advancing material is compressed into a smaller volume to fill channel 19. It should be noted that the type of material and ratio of bores of sections 40 to 50 have an effect upon the degree of compression achieved in section 45.

The embodiment of compression section 45 illustrated is exemplary only and has provided an effective mixing extruder for bulk rubber-like and heavy plastic materials. The stepped diameter of the bore 14 is not viewed as an essential part of the invention since the mixing extruder could work equally well with a straight or constant diameter bore and a change of pitch on flight 18 to effect a reduction in the volume of channel 19. The design choice is made based upon the form and handling characteristics of the material fed to the extruder. With either of the illustrated or above described means 45, or a combination thereof, the advancing material may be caused to fill channel 19 in the mixing section 50 to insure a complete, adequate blending and mixing. Additional compressive forces to insure this operation may also readily be supplemented by grooving the side walls of the bore as previously described and illustrated at 43' in feed section 40 (FIG. 3).

In the illustrative machine the mixing section 50 extends a distance of approximately 5 feet from feed section 40 to discharge section 60. As with feed section 40 the primary flight 18 and channel 19 on rotor 16 spiral coextensively along the body 12 through section 50. Also, as with feed section 40, primary flight 18 provides substantially a pumping action upon the material to force it generally through the mixing section. As such, the primary flight 18 in this section also closely wipes side walls 52 within the bore 14.

As illustrated in FIG. 3, the side walls 52' in mixing section 50 may be grooved to provide additional pumping action therealong. These grooves may be similar to those illustrated in FIG. 3, being axial or helical in general form.

Within mixing section 50, rotor 16 is adapted with a secondary flight 55 which is disposed generally in channel 19 between the adjacent convolutions of the primary flight 18. Flight 55 extends helically from the beginning of the section adjacent compression section 45 through to the discharge section 60. As may be seen in FIG. 1, the pitch of the secondary flight 55 is slightly greater than that of the primary flight 18. Thus, in the rotary operation of the rotor 16, material is captured by the leading edge 56 of the secondary flight 55 and trapped within the secondary channel 57 forward of the secondary flight. As the rotor 16 turns, channel 57 diminishes in volume such that the material is required to exit over the secondary flight 55 into the region 58 (the remainder of channel 19) generally trailing the secondary flight. It is to be noted from the sectional view of FIG. 1 that the contour of secondary flight 55 is streamlined or rounded when compared to that of primary flight 18. It should be recalled that the function of primary flight 18 is to pump the material to be mixed through the extruder 10. It is the function of the secondary flight 55 to mix or blend the material contained in channel 19 generally between successive convolutions of primary flight 18. As such, secondary flight 55 does not closely approach the walls 52 within mixing section 50 and it should further be noted that the leading edge 56 of secondary flight 55 is spaced from, or not joined to, the primary flight 18 such that it may act somewhat as a spear in order to capture material advancing along channel 19.

Since compression section 45 causes channels 19 and 57 to be generally full, the reduction of volume in channel 57 necessarily forces material over flight 55 to the region 58 trailing flight 55 (the remainder of channel 19). During this flow over the rounded flight 55, the material is subjected to a gentle shearing action or one of low intensity both over the flight and against the wall 52. This is achieved through the rounded contour of flight 55 and its spaced relationship with the wall 52.

Double-flighted screws have been used for a variety of reasons in various plasticators or extruders. The most common usage is to separate materials of varying viscosities or to separate liquids from solid materials during a plaasticating process. The function of the secondary flight 55 of the present invention is distinguished from these functions since its function is merely to introduce a disturbance into the material being conveyed along by primary flight 18 such that the material is subjected to a further blending or mixing action. It is also to be appreciated that more than one blending or secondary flight may be incorporated into the screw for additional mixing or blending action. Likewise, the additional flights may be of siumilar or different pitch and, in fact, may vary in pitch throughout.

Mixing section 50 terminates at a high shear section 70 generally adjacent discharge section 60. The forces on the materials up to this point in the feeding and mixing sections 40 and 50 have been generally as imparted by primary flight 18. Some turbulence or disturbance and mixing action has been introduced into the material by secondary flight 55 which is in part due to the material flowing over secondary flight 55. There additionally may be some shear action upon the mixed material as it flows over flight 55. However, the action imparted upon the material by this section is of relatively low intensity, or of a blending nature.

Figure 2:
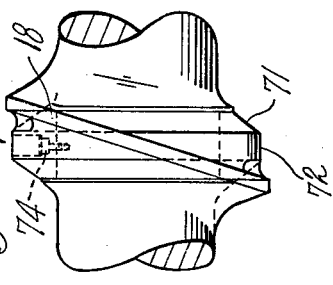
FIG. 2 is an enlarged view of a portion of the apparatus of FIG. 1.

The shear section 70 is disposed annularly on rotor 16 and includes shear collar 71 having a land 72. In the preferred embodiment (and as seen in FIG. 2), primary flight 18 continues along rotor 16, being superimposed on shear collar 71 and across land 72. Shear section 70 subjects the material exiting mixing section 50 to a more intensive shear action relative to the mixing actions previously experienced. This is accomplished by the collar 71 and land 72 wiping the material forcefully against side wall 73 within bore 14. This occurs as the material is forced by primary flight 18 along the channel 19 up the collar 71 and across land 72. It will be recognized that the material is also subjected to a second shear action by virtue of its being forced to flow over the annular land 72, being a disturbance in the channel 19 along rotor formed generally by shear section 70. As with the various flights, the configurations of shear collar 71 may be varied widely to accomodate various materials and mixing actions. As such, the clearance between land 72 and wall 73 may be varied and also the axial dimension of land surface 72.

In a preferred embodiment of the mixing extruder of the invention, the shear collar may be removable by being detachably secured to rotor 16 by means such as bolts 74 (FIG. 2). The collar 71 is thus conveniently in semi-circular annular form and readily attachable to rotor 16. To accommodate attachment and removal of shear collar 71 to rotor 16, the discharge end body 61 is detachably secured to mixing body 59 as by bolts 62. The discharge end body 61 may be supported by known conventional means such as ways, guides, or other supporting means (not shown) so that it may be slidably moved along rotor 16 to provide access to shear collar 70.

This ability to conveniently change the geometry of shear section 70 renders the mixing extruder of the present invention readily adaptable to an "on line" change of intensity of mixing. It is this capability which enables a rapid switch to accommodate a change of material in a process line, or to change the degree of mixing of a particular material.

The mixing extruder 10 illustrated includes a discharge section 60 adjacent discharge opening 28. Within discharge section 60, rotor 16 extends from mixing section 50 to any of a variety of extrusion devices such as die head 26. Similarly to the previous sections, primary flight 18 is effective as a pump to convey the mixed material in channel 19 from the mixing section through the discharge section and out the extrusion opening 28. In practice, a discharge section effectively isolates the previous functions in the extruder (feed section 40 and mixing section 50) from the external discharge environment at the discharge end. Thus, in the illustrative embodiment wherein material is being supplied to calender rolls 32 of roller die 30 through orifice 28, were a material buildup to occur at the nip 36, external back pressures in this region could result. If the discharge to this region were not isolated from mixing section 50, back pressures could be reflected into the mixing section 50 which might interfere with the efficient mixing function thereof. Discharge section 60 in the illustrative embodiment extends approximately 4 feet. This distance in the illustrative embodiment is sufficient for primary flight 18 on rotor 166 to build up a discharge pressure in the material being extruded (such as rubber or the more viscous heavy plastic materials) such that the discharge end effects are not reflected back through to mixing section 50. It is to be appreciated that with varied materials, varied operating speeds of the rotor and different discharge equipment at the discharge end, the length and functional requirements of the discharge section may be varied and, indeed, even eliminated where no particular feedback is generated.

Although the invention embodied in the mixing extruder has been described above in considerable detail, it has been so done for the purposes of illustration and it is to be understood that such detail is solely for this purpose and that variations may be readily made by those skilled in the art according to the above teachings, both in the apparatus and in the operation thereof, without departing from the true spirit and scope of the invention, as expressed in the following claims.

I claim:

1. A mixing extruder for the processing of rubber, plastics and like materials having a housing with a generally cylindrical bore therein and a rotor rotatably mounted in the bore, the bore having a feed opening and a discharge opening at opposite ends thereof, comprising:
   a. a primary helical flight fixed to said rotor and substantially coextensive therewith, said primary flight forming a helical channel for the movement of material in the bore;
   b. a portion of the extruder forming a feed section which communicates with the feed opening and in which the bore and rotor are of relatively enlarged diameter;
   c. a portion of the extruder forming a compression section which communicates with the feed section and in which the diameter of the bore and rotor linearly diminishes as the material progresses from the feed section;
   d. a portion of the extruder forming a mixing section which communicates with the compression section and in which a secondary helical flight is fixed to the rotor intermediate the primary flight, said secondary flight being shaped to mix the material as it passes through the helical channel of the primary flight;
   e. a portion of the extruder forming a shearing section which communicates with the mixing section and in which a shear collar is removably secured to the rotor to create a shearing force on the material as it progresses through the channel of the primary flight; and
   f. a portion of the extruder forming a discharge section which communicates with the shearing section and with the discharge opening and which is of sufficient length to avoid the transmission of back pressures through the extruder.

* * * * *